United States Patent
Lui et al.

(10) Patent No.: US 6,788,815 B2
(45) Date of Patent: Sep. 7, 2004

(54) SYSTEM AND METHOD FOR ACCEPTING DISPARATE TYPES OF USER INPUT

(75) Inventors: Charlton E. Lui, Redmond, WA (US); Charles P. Thacker, Palo Alto, CA (US); James E. Mathews, Bellevue, WA (US); Leroy B. Keely, Portola Valley, CA (US); David Switzer, Redmond, WA (US); William H. Vong, Seattle, WA (US); Butler W. Lampson, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 628 days.

(21) Appl. No.: 09/795,984

(22) Filed: Feb. 28, 2001

(65) Prior Publication Data

US 2004/0071344 A1 Apr. 15, 2004

Related U.S. Application Data

(60) Provisional application No. 60/247,400, filed on Nov. 10, 2000.

(51) Int. Cl.$^7$ .................................................. G06K 9/00
(52) U.S. Cl. ...................... 382/187; 382/189; 382/314; 345/169
(58) Field of Search .................................. 382/186, 187, 382/189, 202, 313, 314; 345/156, 169, 173, 179; 455/556.2

(56) References Cited

U.S. PATENT DOCUMENTS

| | | | | |
|---|---|---|---|---|
| 5,252,951 A | * | 10/1993 | Tannenbaum et al. | 345/156 |
| 5,517,578 A | | 5/1996 | Altman et al. | 382/181 |
| 5,561,446 A | * | 10/1996 | Montlick | 345/173 |
| 5,796,866 A | * | 8/1998 | Sakurai et al. | 382/187 |
| 6,269,187 B1 | * | 7/2001 | Frink et al. | 382/187 |
| 6,340,967 B1 | | 1/2002 | Maxted | 345/179 |
| 6,487,569 B1 | * | 11/2002 | Lui et al. | 715/530 |
| 6,661,920 B1 | * | 12/2003 | Skinner | 382/187 |

* cited by examiner

*Primary Examiner*—Daniel Mariam
(74) *Attorney, Agent, or Firm*—Banner & Witcoff, LTD.

(57) ABSTRACT

A user interface allows a user to input handwritten, keypress, and spoken text in a seamless, synchronized manner. A text input panel accepts soft keyboard presses and handwritten words, characters, and gestures. A text recognizer/synchronizer integrates textual input from various sources while recognizing and preserving the order in which a user entered text via the soft keyboard, via handwriting, and/or by speaking. Synchronized text may be displayed in a stage area of the text input panel before being passed to an operating system message router and/or an application program. While in handwriting recognition mode, various permutations and combinations of a word recognition area, a character recognition area, and a keybar/keypad may optionally be displayed.

18 Claims, 17 Drawing Sheets

SYSTEM AND METHOD FOR ACCEPTING DISPARATE TYPES OF USER INPUT

CROSS-REFERENCE TO RELATED APPLICATIONS

This application claims the benefit of the Nov. 10, 2000 filing date of copending provisional application, serial No. 60/247,400 entitled "System And Method For Accepting Disparate Types Of User Input", which is incorporated herein by reference.

BACKGROUND OF THE INVENTION

As used herein the term Tablet PC refers to, by way of example, without limitation, a full-function "MICROSOFT" "WINDOWS" operating system-based personal computer incorporating various convenient and intuitive aspects of pencil and paper into a user's interaction with a PC. Such Tablet PCs provide a very natural way to interact with a computer, namely, by writing on it, without sacrificing the power or utility of various "WINDOWS" operating systems and/or various "WINDOWS" operating system-based desktop applications. As will be apparent, Tablet PCs, as the term is used herein, are not limited to computers running "WINDOWS" operating system. Instead, a Tablet PC may also run any other known, or later-developed, operating system.

Computer users are generally familiar with interacting with conventional personal computers via a mouse and keyboard. Tablet PC's, however, generally do not have a physical keyboard or a mouse as part of their user interfaces. Instead, the user will often interact with a Tablet PC in the form of inputting textual information, navigating among documents, entering commands, and the like, by using a pen or stylus on the Tablet PC's display.

Conventional stylus and tablet user interfaces have various shortcomings, though. For instance, such conventional user interfaces are typically cumbersome to use, limit a user to one mode of inputting text information at a time, and require that the user manually switch between each of the various input modes.

Tablet PC's are preferably adapted for portability and use in a variety of settings, including, but not limited to, meetings with multiple attendees and in relatively secluded settings, such as in a user's office or home. Because handwritten notes are more appropriate in a meeting setting, while speech may be more efficient for entering text into correspondence from a relatively private setting, an integrated spectrum of various ways to enter textual information into a Tablet PC is desirable. Accordingly, there is a need for an improved computer user interface that allows users of Tablet PC's to input multimedia text information (including, but not limited to, handwritten text, spoken text, and/or virtual keyboard-entered text) in various ways, while minimizing the required amount of manual switching between input modes.

SUMMARY OF THE INVENTION

A system and method in accordance with certain inventive principles overcomes the foregoing shortcomings of conventional stylus and tablet user interfaces by providing a text input panel ("TIP") for accepting soft keyboard presses and handwritten words, characters, and gestures. A text input panel in accordance with various principles of the invention allows a user to input handwritten, key-press, and spoken text in a seamless, synchronized manner that takes advantage of the benefits of each manner of inputting text. Such benefits may depend upon the effectiveness and/or the appropriateness of using a particular input method under certain circumstances.

A text recognizer/synchronizer integrates textual input from various sources while recognizing and preserving the order in which a user entered text via the soft keyboard, via handwriting, and/or by speaking. Synchronized text may be displayed in a stage area of the text input panel before being passed to an operating system message router and/or an application program. While in handwriting recognition mode, various permutations and combinations of a word recognition area, a character recognition area, and a keybar/keypad may optionally be displayed.

Additional features and advantages of the invention will be apparent upon reviewing the following detailed description.

DETAILED DESCRIPTION OF THE INVENTION

Figure 1:
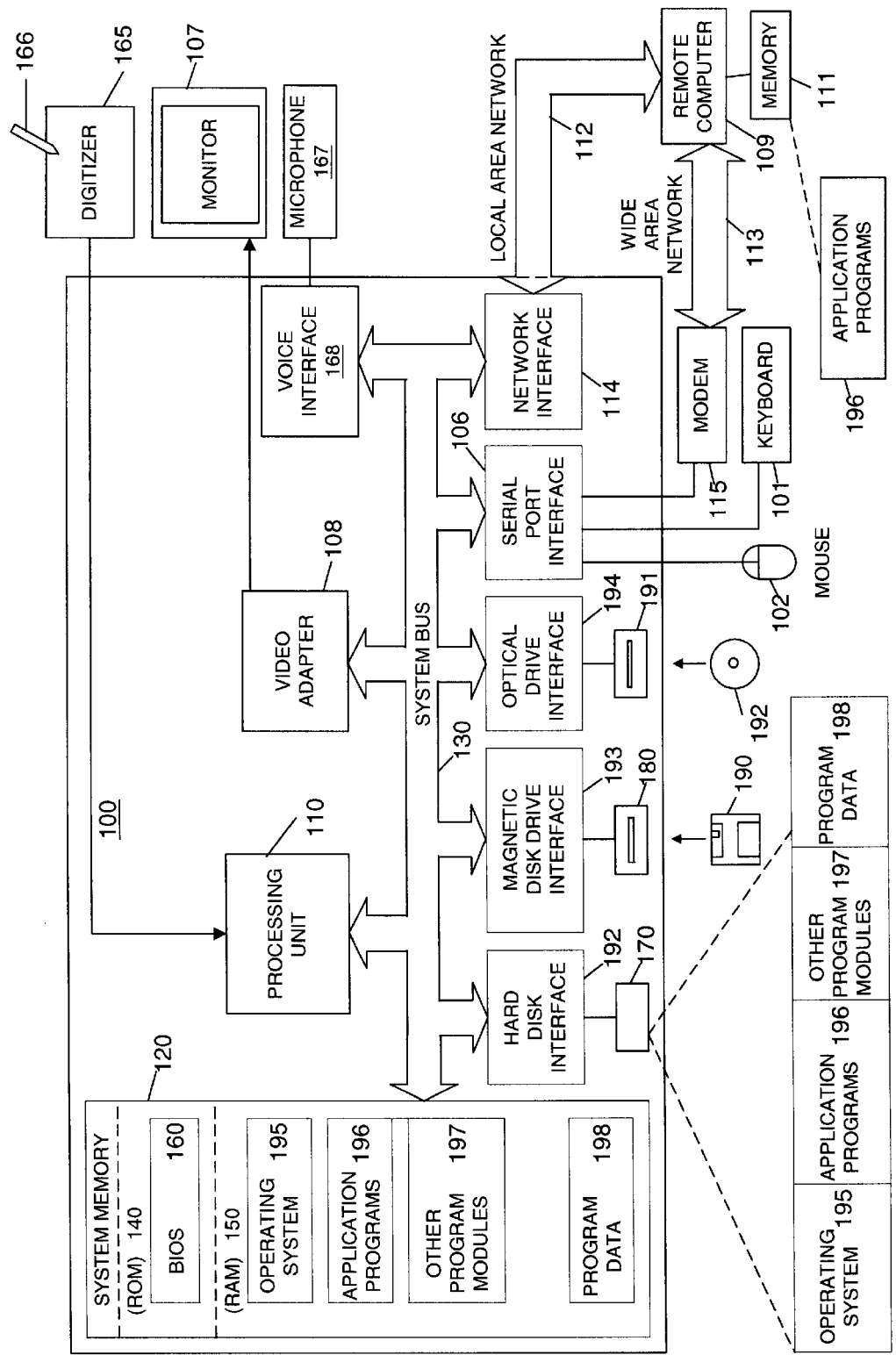
FIG. 1 is a schematic block diagram of a conventional general-purpose digital computing environment that can be used to implement various aspects of the present invention.

The present invention may be more readily described with reference to FIGS. 1–27. FIG. 1 illustrates a schematic diagram of a conventional general-purpose digital computing environment that can be used to implement various aspects of the present invention. In FIG. 1, a computer 1 DO includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107. Microphone 167 is coupled to the system bus via a voice interface 168 in a well-known manner.

The computer 100 can operate in a networked environment using logical connections to one or more remote computers, such as a remote computer 109. The remote computer 109 can be a server, a, router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
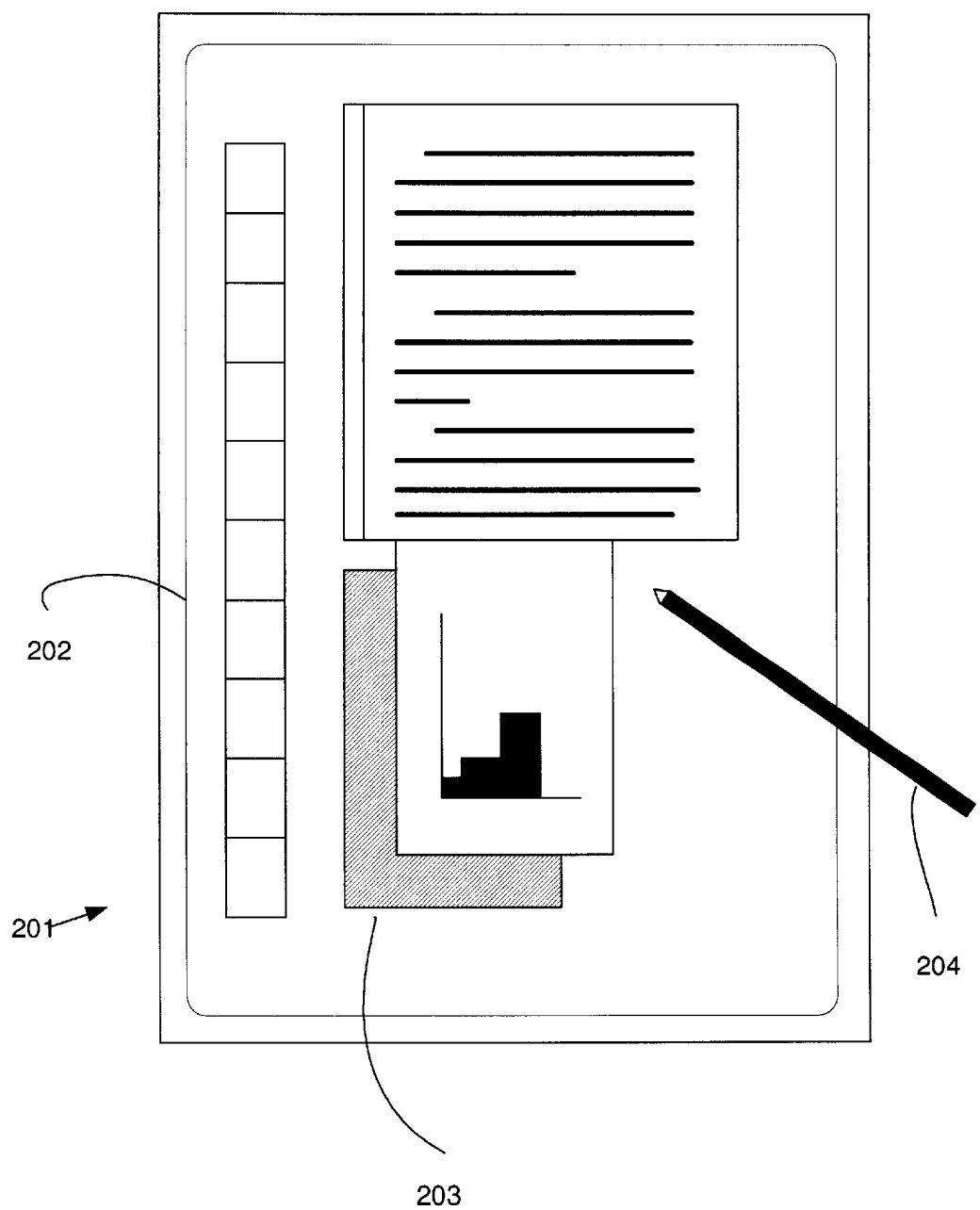
FIG. 2 illustrates a Tablet PC that can be used in accordance with various aspects of the present invention.

FIG. 2 illustrates a Tablet PC, also referred to herein as a tablet and stylus computer, which can be used in accordance with various aspects of the present invention. Any or all of the features, subsystems, and functions in the system of FIG. 1 can be included in the computer of FIG. 2. The computer 201 includes a large display surface 202, e.g., a digitizing flat panel display, preferably, a liquid crystal display (LCD) screen, on which a plurality of graphical user interface windows 203 is displayed. The display is preferably oriented in "portrait" mode (i.e., vertically), as opposed to "landscape" mode (i.e., horizontally). Using stylus 204, a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. The computer 201 interprets marks made using stylus 204 in order to manipulate data, enter text, and execute conventional computer application tasks such as spreadsheets, word processing programs, and the like.

A stylus could be equipped with buttons or other features to augment its selection capabilities. In one embodiment, a stylus could be implemented as a "pencil" or "pen", in which one end constitutes a writing portion and the other end constitutes an "eraser" end, and which, when moved across the display, indicates portions of the display are to be erased. Additionally, a user's own finger could be used for selecting or indicating portions of the displayed image on a touch-sensitive or proximity-sensitive display.

In accordance with various inventive principles, a Tablet PC user interface accepts a spectrum of input ranging from entering characters via a simple virtual keyboard through single stroke or single character recognition. Single stroke refers to using one stroke to symbolize a character. The spectrum continues from single character through cursive handwriting recognition to speech recognition. A user interface in accordance with the principles of this invention, preferably integrates these concepts together into a single user interface that allows a user to input text information via various types of input in a seamlessly integrated and synchronized manner such that the order in which text is input by a user in different forms, such as handwritten text and spoken text, is recognized and preserved.

These text input techniques typically work differently, that is relatively more or less effectively, for different users. For example, handwriting recognition and speech recognition may work well for some users and not as well for other users. Of course, any particular user is more likely to use recognition techniques that work relatively more efficiently than other techniques in any given circumstance. For instance, while speech recognition may work well for a user, it might be inappropriate for a social context such as a meeting with other people. For dictating a letter in a relatively private setting, however, speech recognition may be more appropriate. Ambient noise may also affect the effectiveness of speech recognition. In general terms, individual users will tend to use different input methods at different times.

Depending upon what the input is, different types of recognition may be relatively more or less effective. For instance, cursive handwriting recognition may be very effective for a textual document that includes relatively few special symbols. A symbol recognizer, on the other hand, will typically be relatively more effective at recognizing URL's, mathematical equations, and the like.

Preferably, a user is able to configure various layout settings of a text input panel ("TIP") in accordance with various inventive principles. For example, the character recognizer may be shown or hidden based upon how the user configures the user interface. Several possible layout variations are set forth in the figures and are discussed below. As will be apparent, other suitable layouts could also be used.

Figure 3:
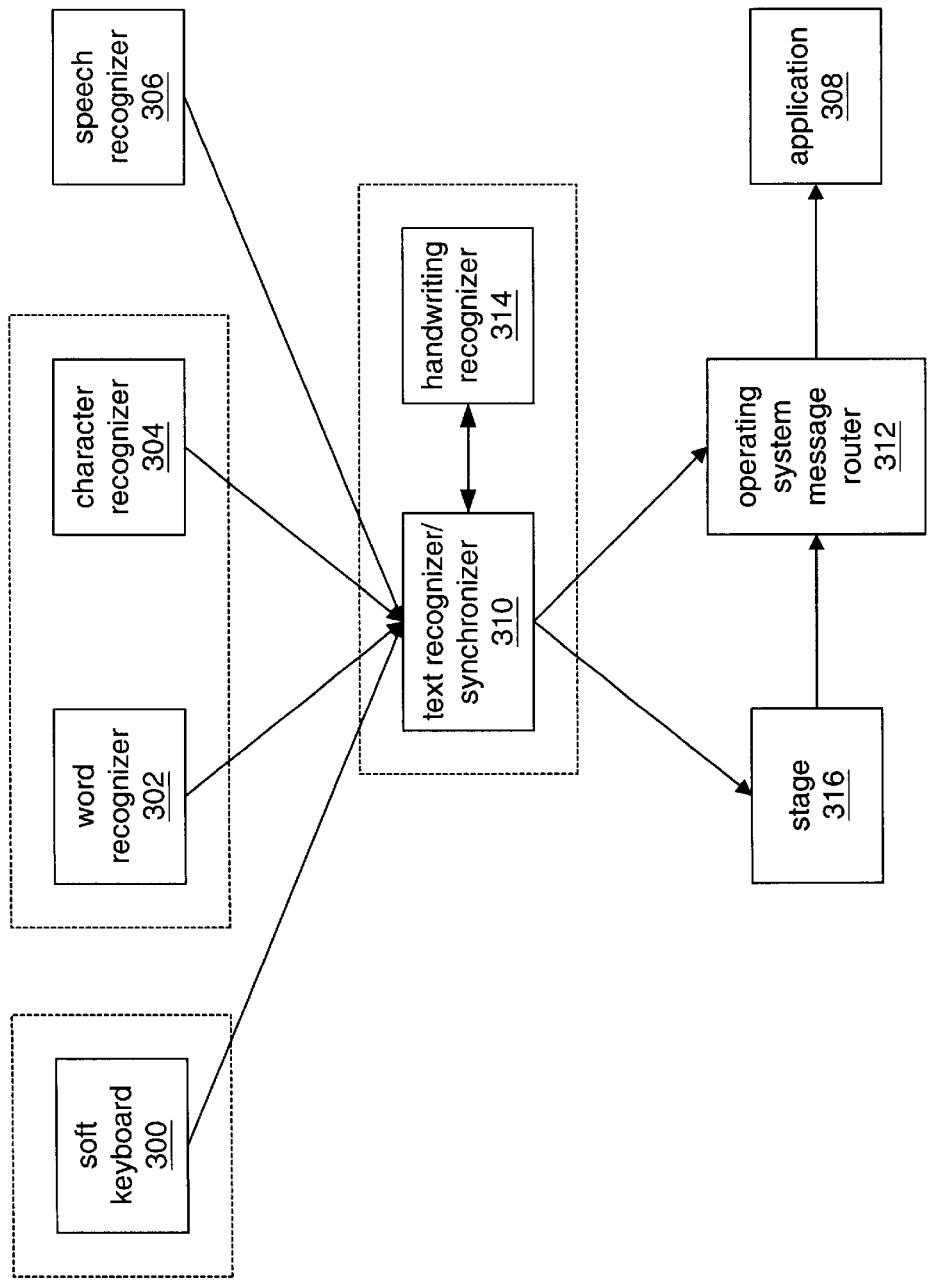
FIG. 3 is a simplified schematic block diagram depicting data flow among various input recognizers and other components in accordance with certain inventive principles.

FIG. 3 is a simplified schematic block diagram depicting data flow among various input recognizers and other components in accordance with certain inventive principles. Referring to FIG. 3, a soft keyboard 300 processes input from a Tablet PC's virtual keyboard/key bar/symbols. In other words, the soft keyboard 300 processes input, other than handwriting, in the form of button clicks and menu choices. A word recognizer 302 and a character recognizer 304, on the other hand, are grouped together within a box drawn in dashed lines to indicate that both of these recognizers may be presented together to the user, subject to the manner in which the user configures the text input panel. The dashed-line box around soft keyboard 300 indicates that, from the user's perspective, the soft keyboard is a different part of the user interface than the word and character recognizers. A speech recognizer 306 translates the user's speech, which may be entered by a user through microphone 167 (FIG. 1), into text.

A user's goal in using a TIP is typically to input text to an application program 308. The soft keyboard is a reliable way to enter text into an application. The user brings up the soft keyboard and actuates it by tapping on keys with the user's pen or stylus. On-screen presses are translated into actual keystroke commands that an operating system understands.

The soft keyboard may be sized automatically to approximately the same size that the word recognizer and character recognizer previously occupied on the display. Alternatively, separate size, could be stored for use with the soft keyboard, on the one hand, and the character and word recognizers, on the other hand.

The soft keyboard, character, word, and speech recognizers each pass data to a text recognizer/synchronizer 310, which synchronizes and integrates input from these sources so that if a user inputs some handwriting and then taps on a soft keyboard key, text recognizer/synchronizer 310 preserves the order in which the user entered the input from various sources. Text synchronizer 310 preferably executes as a background process. Notwithstanding that the word recognizer operates fairly quickly as perceived by the user, the synchronization mentioned above is desirable because the word recognizer typically takes longer to recognize words than the soft keyboard takes to recognize key presses. Accordingly, if a user writes several words in the word recognizer area, also referred to as the word pad, then taps the space key, the words are preferably recognized first. Then, the space is inserted into the text following the recognized words, rather than ordering the recognized text in the order in which recognition of the text was completed, which would not necessarily preserve the order in which the user entered the text. Speech recognition, like handwriting recognition, is typically relatively slower than recognition of a soft keyboard press.

In addition, a user may turn off automatic word recognition, which otherwise preferably occurs after a user-configurable timeout expires following a period of inking inactivity. When automatic word recognition is turned off, word recognition will not occur until the user performs a text input panel operation other than writing words.

The handwriting recognizer 314 is shown within the same dashed-line box in FIG. 3 as the text recognizer/synchronizer 310 to indicate that handwriting recognition and synchronization of textual input from various sources may both be implemented as part of a process, or execution thread, that preferably executes in the background to allow the user interface to remain responsive to incoming requests from the user. Recognition results are then passed from the background text recognizer/synchronizer 310 to the operating system message router 312, which passes the recognition results, typically in the form of text, to the application 308.

Recognition results may optionally be passed to a window for providing a preview of the recognition results. This preview window is also referred to as a stage and is depicted in FIG. 3 with reference number 316. The stage may pass the recognition results to an operating system message router 312.

Because the text input panel typically does not have direct access to various applications running on the user's computer, the recognized text is displayed and a menu of alternate choices that have come back from the recognizer may also be provided so that the user can correct recognition inaccuracies before the text input panel sends the text to one or more applications. A re-do/re-send button (not shown) may be provided so that a user can send the same text to multiple applications or can re-send text that did not reach the intended application.

The character recognizer preferably recognizes various strokes or gestures as abbreviations for certain characters or special symbols. Some gestures may be carried over from the character recognizer to the word recognizer. For instance, there may be a left-to-right horizontal stroke for the character recognizer that is recognized as a blank space character and a right-to-left horizontal stroke that is recognized as a backspace. Because spaces and backspaces are entered frequently, the text input panel preferably recognizes these gestures entered into an empty word recognizer area. Having a vocabulary of gestures that a user can mix with the user's natural handwriting provides convenience and increased efficiency to the user.

A user can preferably have a text input panel displayed and also get to see through the text input panel to what's underneath the text input panel. Because displaying the text input panel in a translucent fashion may be undesirable to some users under certain circumstances, users are preferably able to configure the text input panel to be displayed in translucent form never, always, or when the user's pen hovers over the text input panel.

Like the symbol and character recognizer pads shown in various figures and discussed above, a gesture pad could be provided. A user's inking or gestures in such a gesture pad area could be interpreted as a gesture as opposed to a symbol or other character. Such a gesture pad would advantageously increase the accuracy of the left-to-right gesture being interpreted as a space instead of being erroneously recognized as a hyphen or an underscore, for instance.

Figure 4:
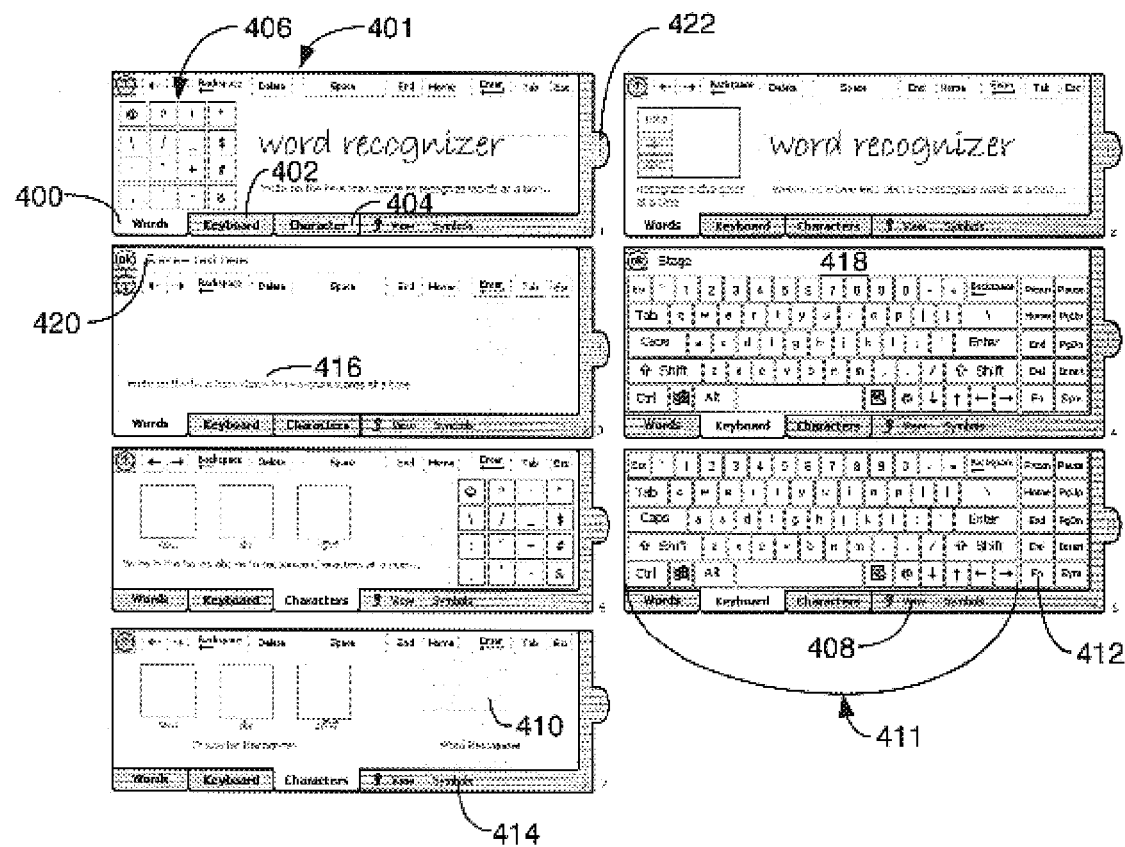
FIG. 4 depicts several example layouts for a slide out text input panel ("TIP") having three tabs for switching between input recognizers.

FIGS. 4–27 show various example layouts for a text input panel in accordance with various inventive principles. Display of these example layouts may be performed in a well-known manner for displaying various components of graphical user interfaces. FIG. 4 depicts several example layouts for a slide-out text input panel 401 having three tabs for switching between input recognizers, namely, Words tab 400, Keyboard tab 402, and Characters tab 404. The example layouts shown in FIG. 4 are numbered in the lower right hand corner of each example layout from 1 through 7, with layouts 1 and 2 on the first horizontal row, layouts 3 and 4 on the second row, etc. The Words tab 400 corresponds to a word recognizer. A symbol button pad 406 is shown in Example layout 1. The symbol button pad facilitates entry of symbol characters, such as the symbols shown on the symbol pad 406 of example layout 1 of FIG. 4.

A view menu symbolized by the word "View" 408 on the tab bar allows a user to select between using a tab, such as the Words tab, with a symbol pad, character recognizer, or none at all, as depicted in example layouts 1, 2, and 3 of FIG. 4, respectively. The Character tab may also interact with the view menu in a similar manner. Users can toggle on/off or swap the symbol pad with the word recognizer 410, as depicted in example layouts 5 and 7 of FIG. 4, respectively. The Keyboard 411 may be a simplified "Qwerty" layout without the function keys, as shown in example layouts 4 and 6 of FIG. 4. In such a layout, the Fn button 412, which is located in the lower right-hand corner of layouts 4 and 6, may be used to open a pop-menu of function keys, F1–12. The Symbols menu item 414 in the tab bar may be used to bring up an MRU (most recently used) menu of symbols and/or other prioritized symbols.

User assistance can be found in a status help area 416 on example layouts 1, 2, 3, 5, and 7 of FIG. 4. These example layouts use the area just below the recognition pads (the area where "word recognizer" appears in layout 1) to give the user, better cues on what each tab does and how it works. As shown in FIG. 4, layouts 1–3 and 7 include word recognizer areas, such as word recognizer area 410, for recognizing handwritten words, while example layouts 5 and 7 include character recognizer areas for recognizing handwritten characters and/or gestures, as described in more detail below.

The word recognition grid may use a watermark (not shown), which could disappear when the pen is hovered over it, for showing users where recognized handwritten text, also referred to as ink, should be written. The Stage 418, which is an area for displaying a preview of recognized characters, symbols, or words, also has descriptive text 420 that appears when it is first opened, as shown near the top of example layout 3 of FIG. 4.

The "thumb tab" 422 appearing near the middle from top to bottom on the right side of each example layout in FIG. 4 can be used to "slide out" a text input panel 401 when a user wants to use the text input panel. Under such circumstances, while the text input panel is not being used, only the thumb tab may be displayed to a user. When the user selects, clicks on, or activates the thumb tab, the text input panel can be displayed, which is referred to as sliding out above. The thumb tab can be used again after the user is done with the text input panel to "hide" or slide in the text input panel, with the possible exception of the thumb tab.

Figure 5:
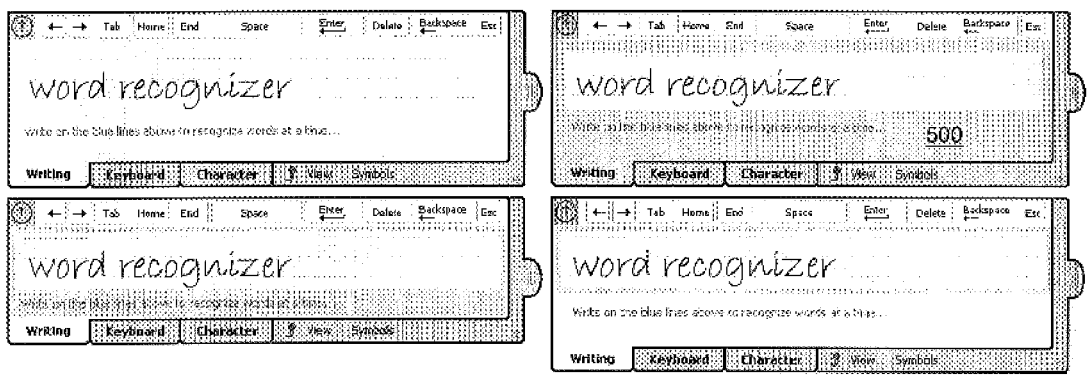
FIG. 5 depicts several example layouts for the Word recognizer area of FIG. 4.
Figure 5:
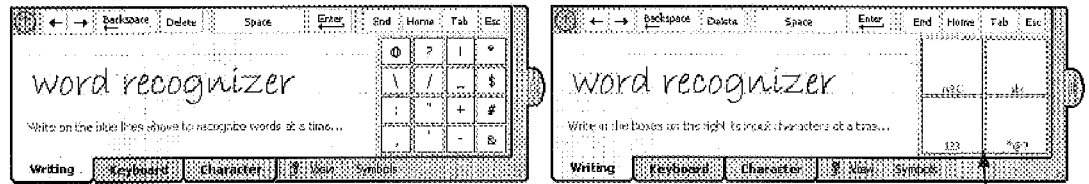

FIG. 5 depicts several example layouts for the Word tab of FIG. 4, referred to as the Writing tab in FIG. 5. A gray border 500 area may be included to focus a user's attention to the edit line areas. Anything written in the gray border area is preferably not recognized or rendered on the screen as ink. The bottom right example layout includes a grid design 502 for the character recognizer on the right side with discrete areas for capital letters, lower case letters, numbers, and symbol characters. The other example layouts of FIG. 5 show various embodiments of a word recognizer area in accordance with certain inventive principles.

Figure 6:
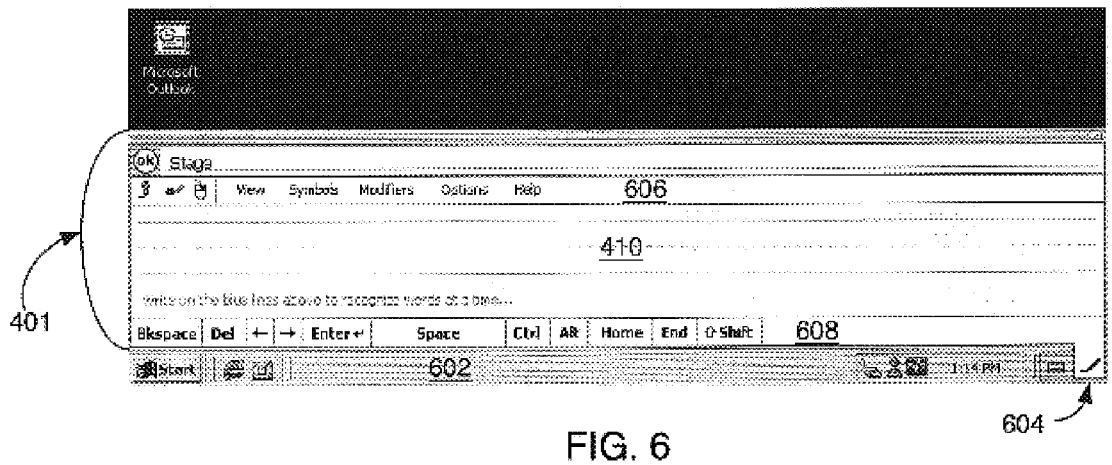
FIG. 6 depicts a text input panel docked at the taskbar.

FIG. 6 depicts a text input panel 401 docked at (i.e., positioned above and adjacent to) the taskbar 602. Taskbar 602 includes a status area 604 at the right side of the taskbar. The text input panel 401 is depicted as having been launched from the status area 604. The keyboard 411 and word recognizer area 410 are presented as tabs in the status area 604 of the taskbar 602. This example layout also has a menu bar 606 on top with a keybar 608 below. This layout occupies the full width of the display screen. The text input panel 401 depicted in FIG. 6 could be grabbed by the top bar and ripped off (i.e., dragged away from) the taskbar to float like a separate window.

Figure 7:
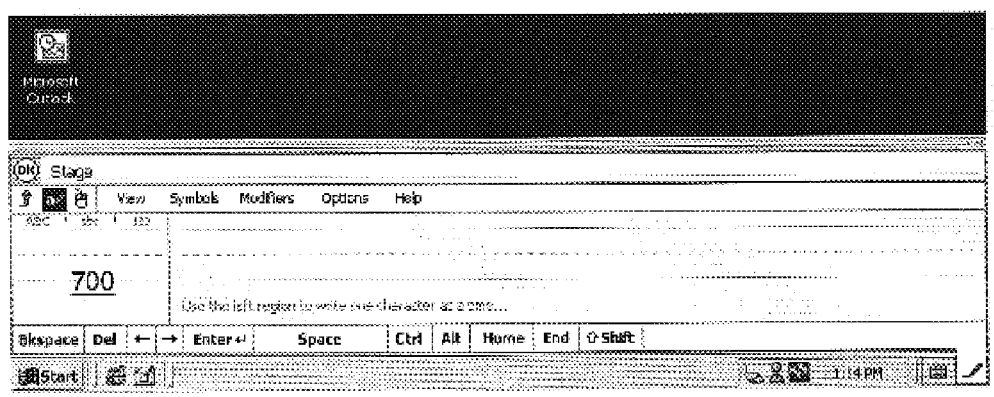
FIG. 7 depicts a text input panel docked at the taskbar as in FIG. 6 with a character recognizer area.

FIG. 7 depicts the text input panel docked at the taskbar as in FIG. 6 with a "jot" 700 (i.e., character recognizer) selected from the menu bar. As opposed to a word recognition input area, in which recognition processing is performed in an attempt to recognize entire words, the character recognizer 700 is used to input data to a recognition process that attempts to recognize individual characters.

Figure 8:
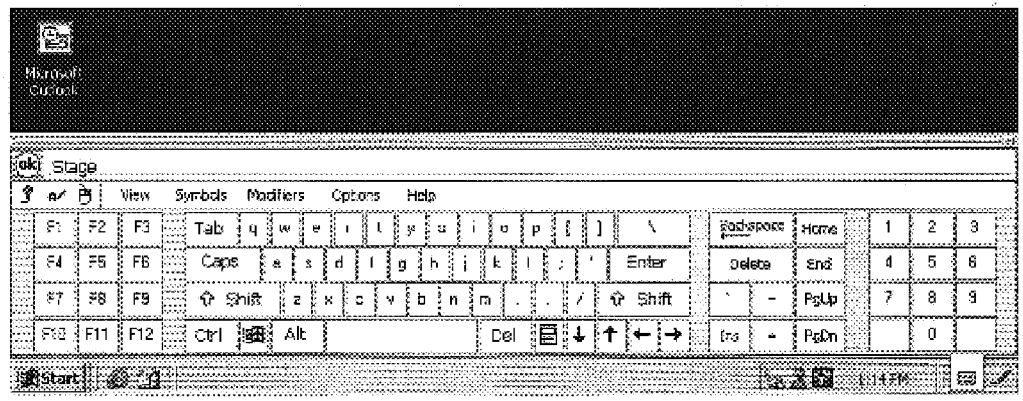
FIG. 8 depicts the text input panel docked at the taskbar as in FIG. 6 with the keyboard displayed.

FIG. 8 depicts the text input panel docked at the taskbar as in FIG. 6 with the keyboard displayed, instead of the word recognizer area 410, which is displayed in FIG. 6. As shown in FIG. 8, the keyboard is displayed when the keyboard icon in the lower right hand corner is selected.

Figure 9:
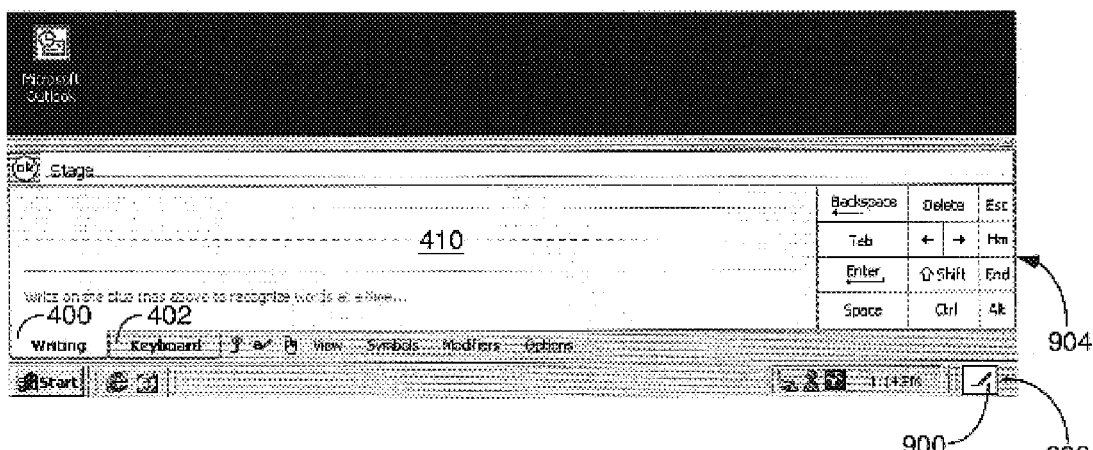
FIG. 9 depicts the text input panel docked at the taskbar as in FIG. 6 with a toggle-on button in the lower right-hand corner and a keybar as a button pad to the right.

FIG. 9 depicts the text input panel docked at the taskbar as in FIG. 6 with a toggle-on button 900 in the lower right-hand corner. The pop-up menu arrow 902 to the right of the status icon 900 can be used to switch between the word recognition area 410 and the keyboard 411. The Writing tab (also referred to above as the Word tab) 400 and the Keyboard tab 402 can also be used to switch between the word recognition area 410 and the keyboard 411. The example layout of FIG. 9 includes the keybar as a button pad 904 to the right of the word recognition area 410.

Figure 10:
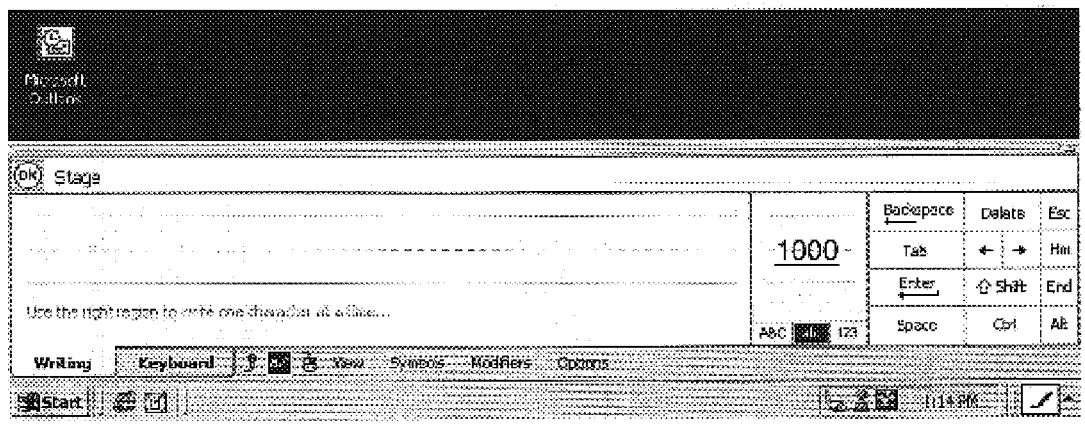
FIG. 10 depicts the character recognizer area on and as a single pad.

FIG. 10 depicts the character recognizer area 1000 as a single pad, as opposed to the separate areas provided in the lower-right-hand layout of FIG. 5 (grid 502), discussed above. The character pad of FIG. 10 can be set to recognize capital/upper-case letters, lower-case letters, or numbers and symbols by selecting the buttons below the character pad 1000.

Figure 11:
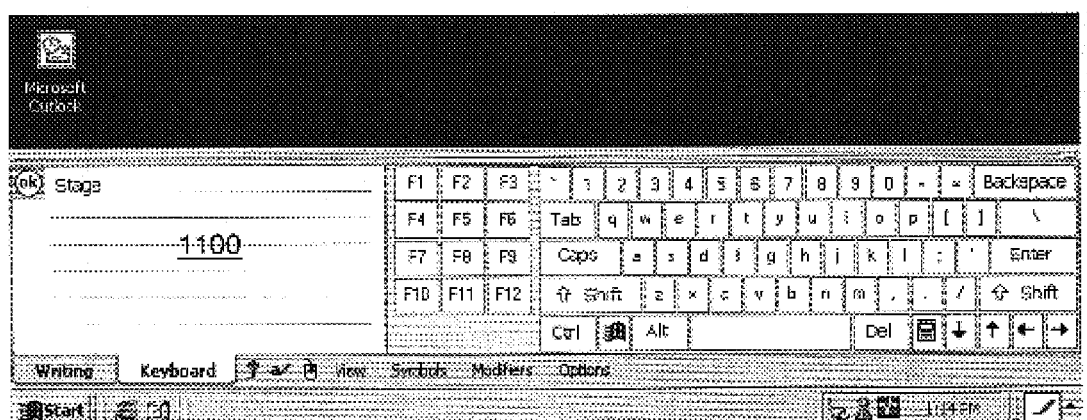
FIG. 11 depicts the docked text input panel with a multi-line stage.

FIG. 11 depicts the docked text input panel with a multi-line stage 1100, which as mentioned above, may be used to show a user a preview of the handwriting, keyboard, and/or speech recognition results.

Figure 12:
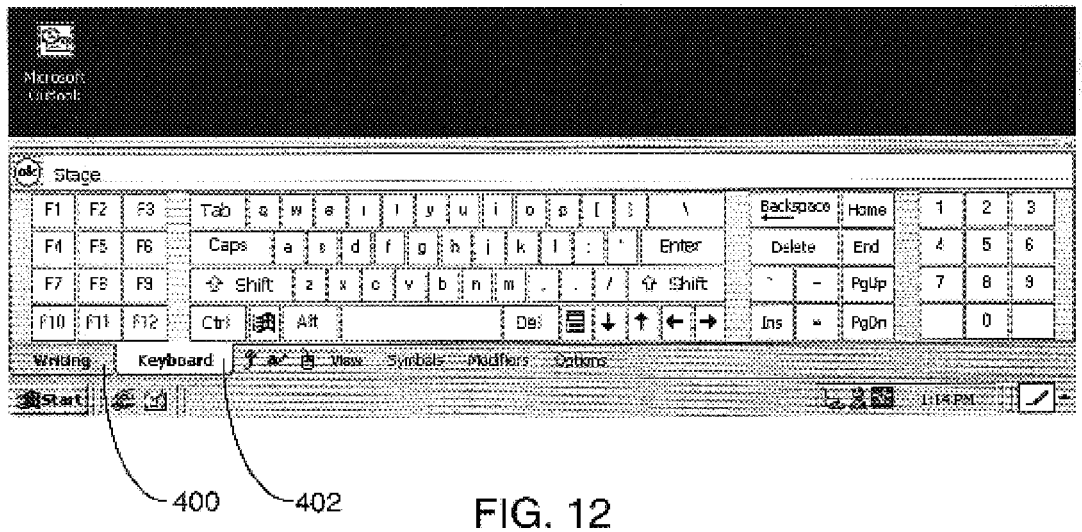
FIG. 12 depicts a docked text input panel with a fall width keyboard.
Figure 13:
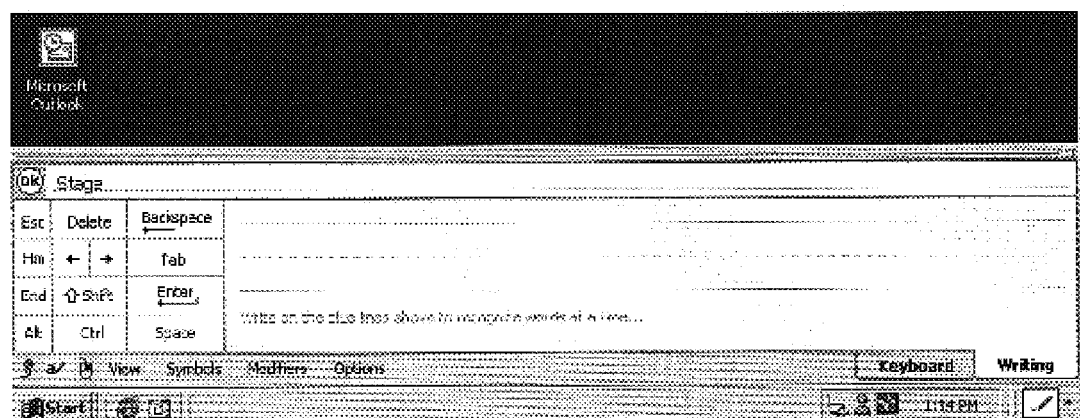
FIG. 13 depicts an example layout with a docked TIP, having the keybar shown as a keypad on the left-hand side.
Figure 14:
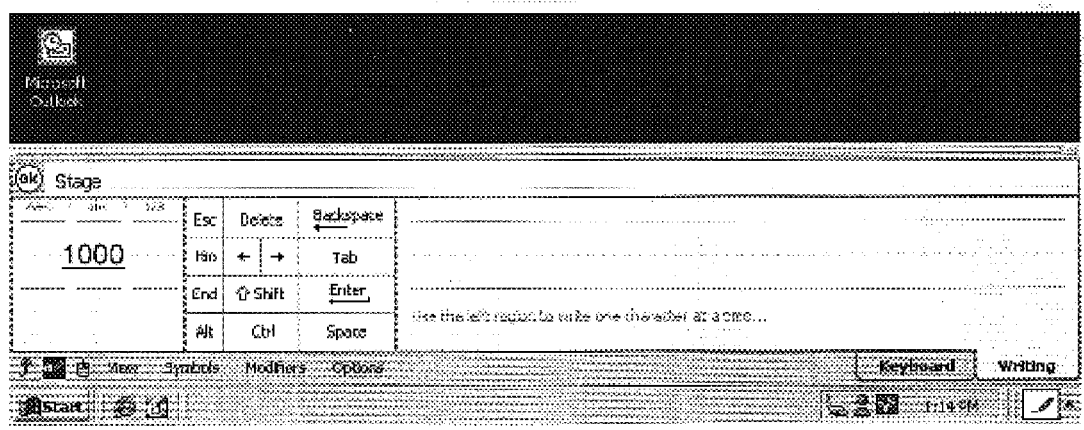
FIG. 14 depicts an example layout with a docked TIP having a character recognizer area, also referred to as a jot, on the left-hand side.
Figure 15:
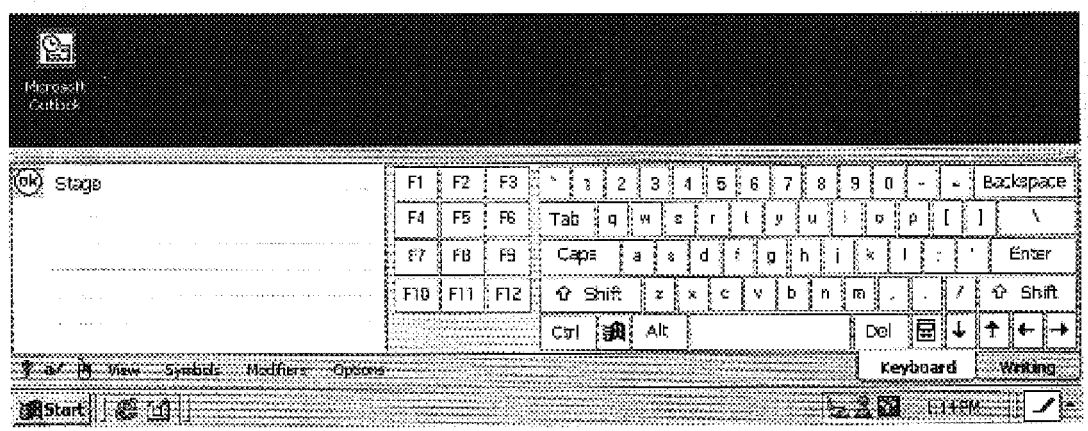
FIG. 15 depicts an example layout with a docked TIP having a multi-line stage to the left and Keyboard and Writing tabs to the right.
Figure 16:
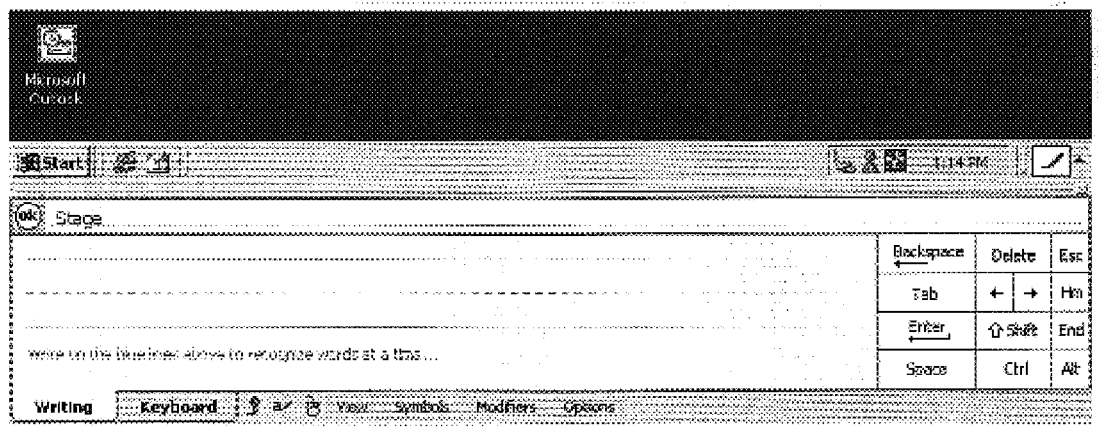
FIG. 16 depicts an example layout with a docked TIP below the taskbar.
Figure 17:
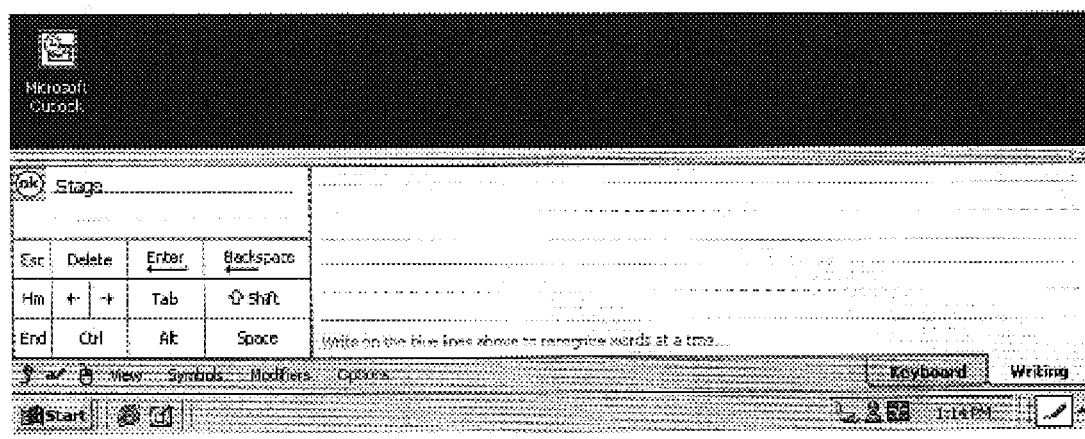
FIG. 17 depicts an example layout with a docked TIP having a double-line word recognizer area and a double-stacked keybar and stage to the left.
Figure 18:
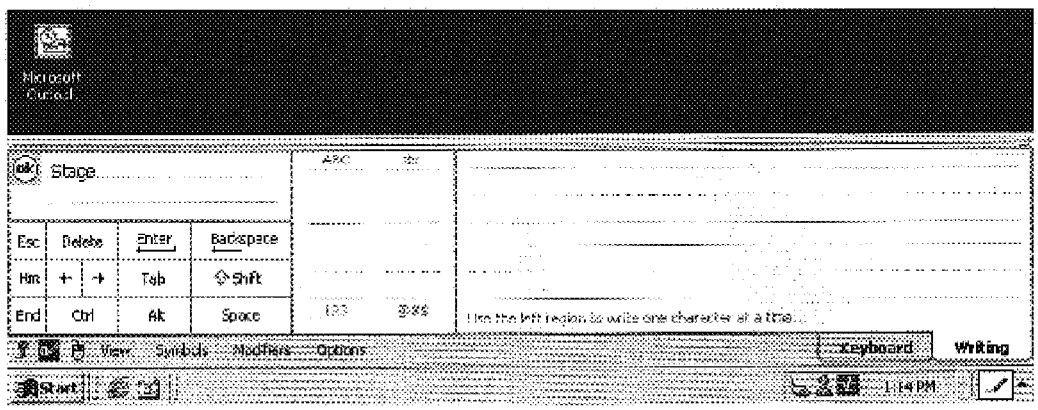
FIG. 18 depicts an example layout similar to the example layout in FIG. 17 and depicting a character recognizer area to the left of the word recognizer area.
Figure 19:
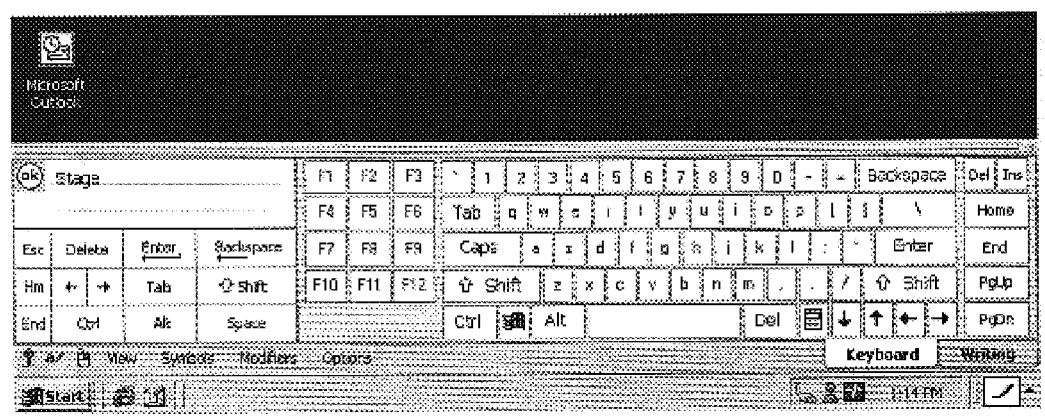
FIG. 19 depicts an example layout similar to the example layout in FIG. 17 with the keyboard shown instead of the word recognizer area.
Figure 20:
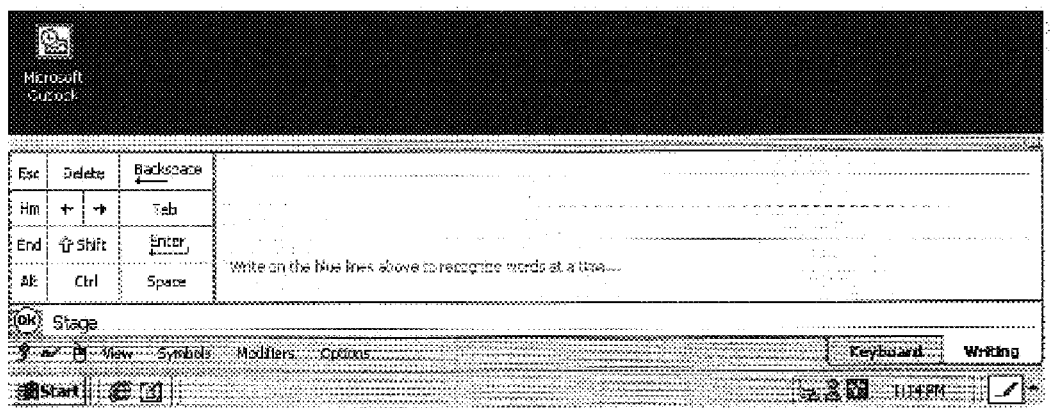
FIG. 20 depicts an example layout with a docked TIP having a stage at the bottom and a keybar, in the form of a keypad, to the left.
Figure 21:
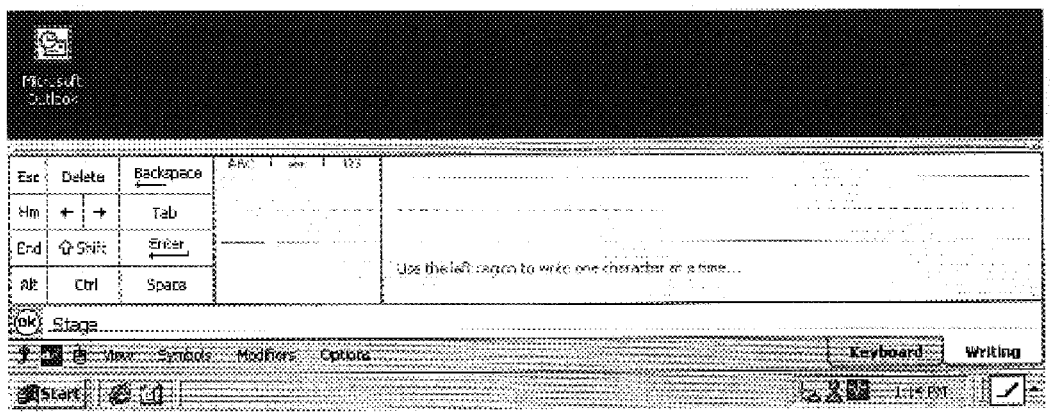
FIG. 21 depicts an example layout similar to the example layout in FIG. 20 with a character recognizer area shown.
Figure 22:
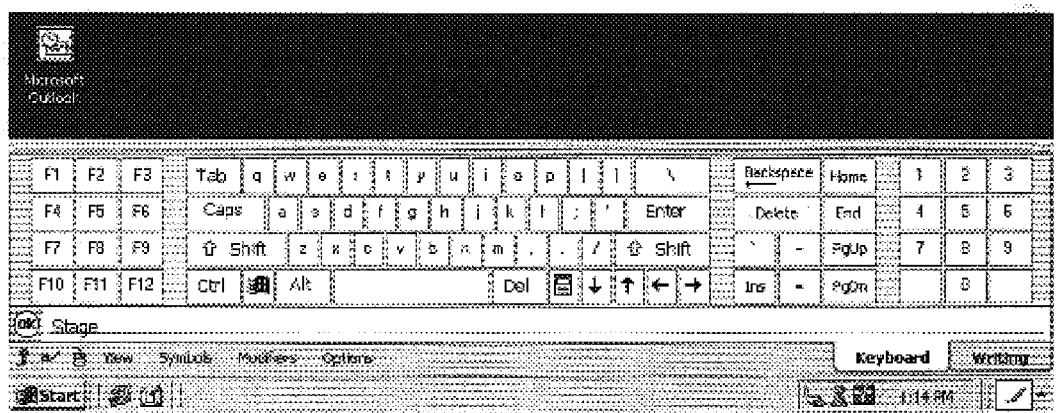
FIG. 22 depicts an example layout with a keyboard shown and a stage area at the bottom.
Figure 23:
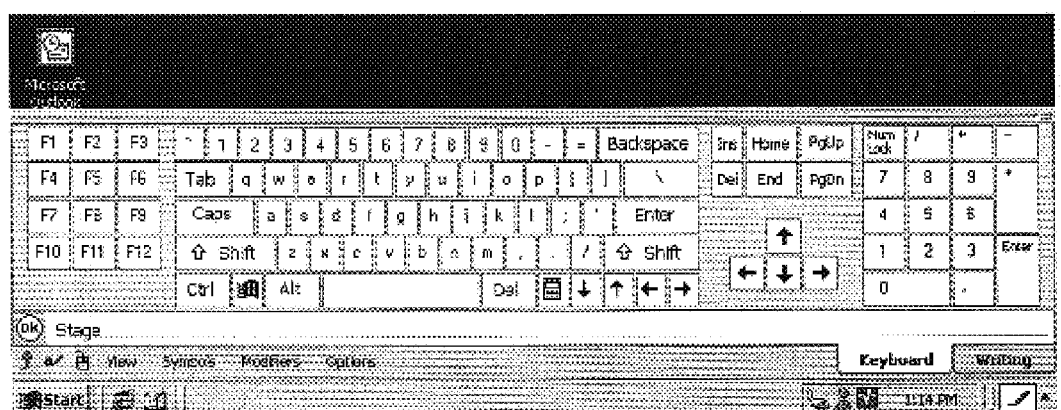
FIG. 23 depicts an example layout similar to the example layout shown in FIG. 22 with a different keyboard layout.
Figure 24:
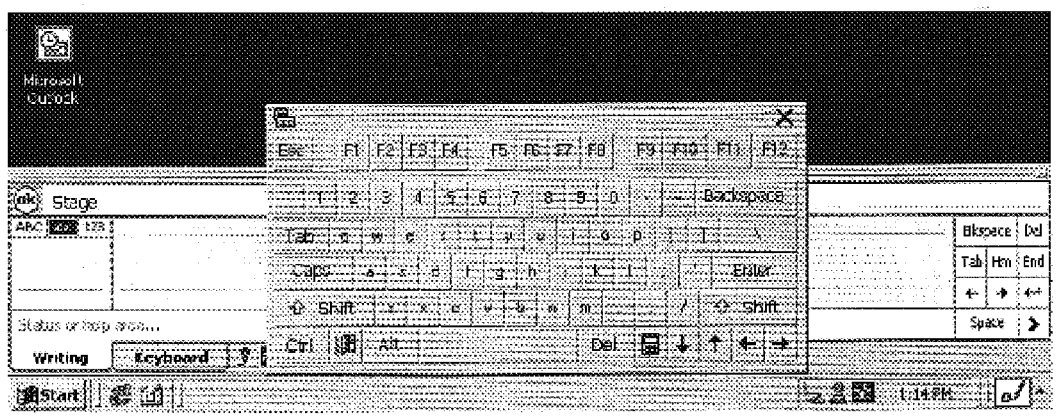
FIG. 24 depicts an example layout in which the keyboard is rendered in a window on top of the word recognition area, status/help area, and tab bar.
Figure 25:
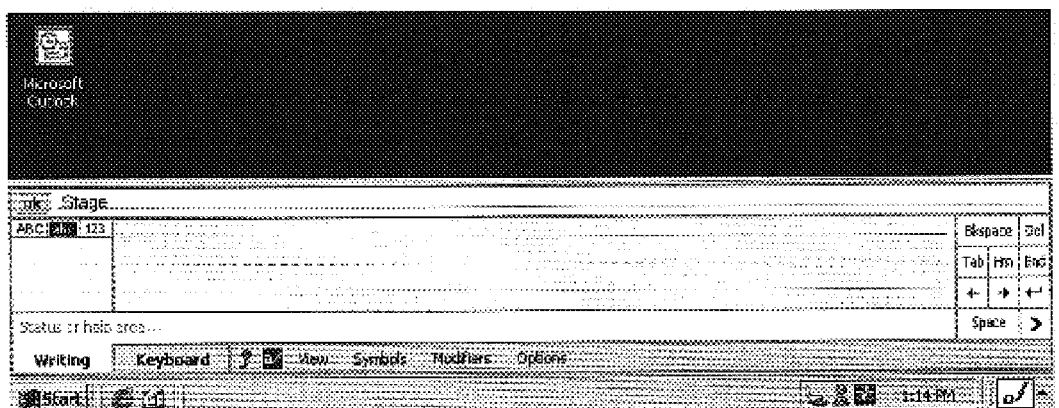
FIG. 25 depicts an example layout with a keypad to the right having soft keys such as the delete, end, home, and tab keys.
Figure 26:
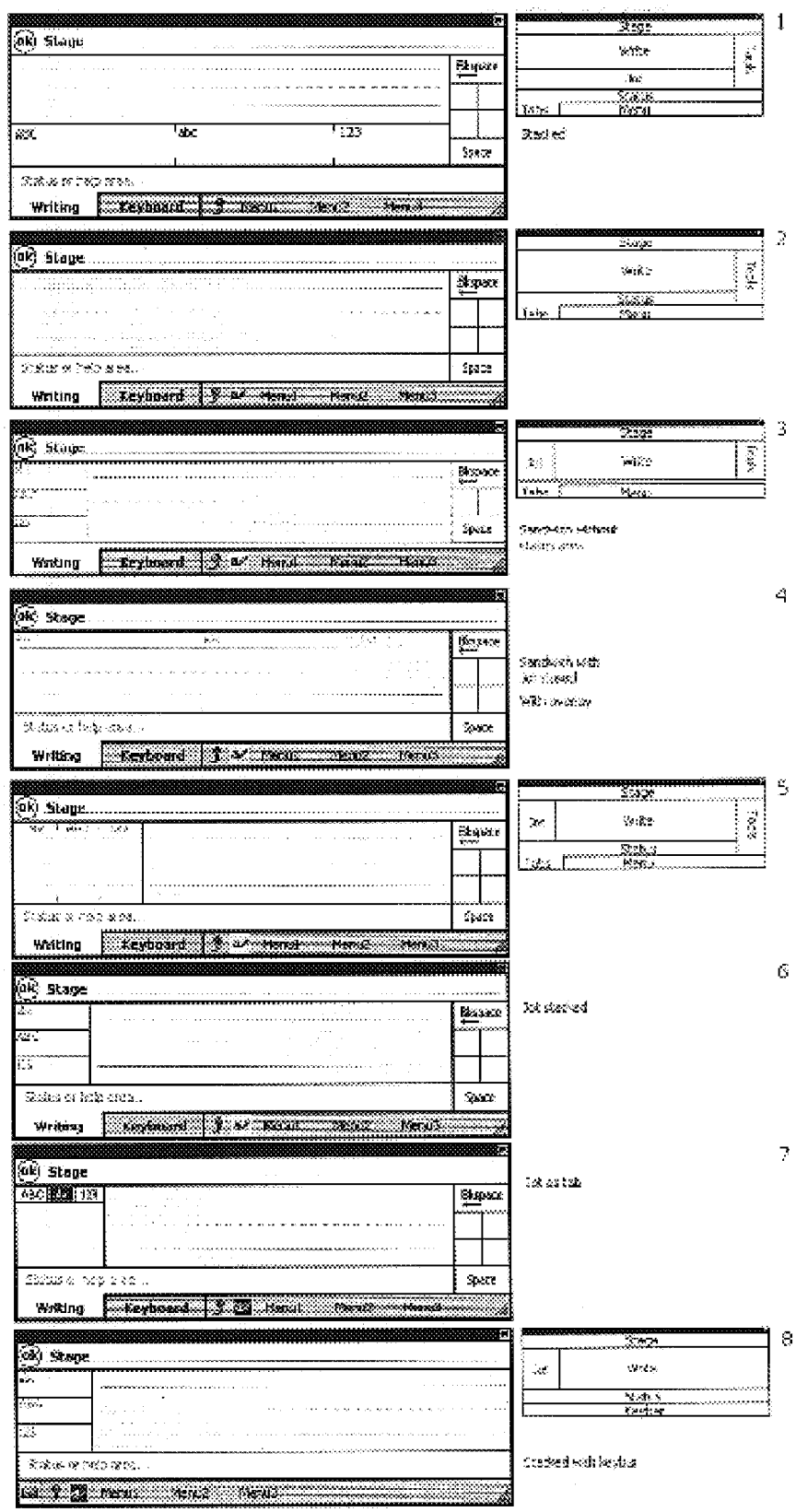
FIG. 26 shows multiple additional layouts, including a tools area with backspace and space soft keys.

FIG. 12 depicts a docked text input panel with a full width keyboard. In FIG. 12, the Keyboard tab 402 and the Writing tab 400 appear to the left-hand side. As will be apparent, the keyboard and writing tabs could also be placed in other suitable locations. As will also be apparent other text input panel layouts could also be used. For example, FIGS. 13 through 27 depict additional example layouts for a text input panel ("TIP") in accordance with various inventive principles. FIG. 13 depicts an example layout with a docked TIP, having the keybar shown as a keypad on the left-hand side. FIG. 14 depicts an example layout with a docked TIP having a character recognizer area 1000, also referred to as a jot, on the left-hand side. FIG. 15 depicts an example layout with a docked TIP having a multi-line stage 1100 to the left and Keyboard and Writing tabs 402 and 400 to the right. FIG. 16 depicts an example layout with a docked TIP below the taskbar. FIG. 17 depicts an example layout with a docked TIP having a double-line word recognizer and a double-stacked keybar and stage to the left. FIG. 18 depicts an example layout similar to the example layout in FIG. 17 and depicting a character recognizer area to the left of the word recognizer area. FIG. 19 depicts an example layout similar to the example layout in FIG. 17 with the keyboard shown instead of the word recognizer. FIG. 20 depicts an example layout with a docked TIP having a stage at the bottom and a keybar in the form of a keypad, to the left. FIG. 21 depicts an example layout similar to the example layout in FIG. 20 with a character recognizer area shown. FIG. 22 depicts an example layout with a keyboard shown and a stage area at the bottom. FIG. 23 depicts an example layout similar to the example layout shown in FIG. 22 with a different keyboard layout including an inverted "T" for up, down, left, and right arrows and a number pad similar to a number pad commonly present on a conventional physical keyboard. FIG. 24 depicts an example layout in which the keyboard is rendered in a window on top of the word recognition area, status/help area, and tab bar. FIG. 26 shows multiple additional layouts, including a tools area with backspace and space soft keys. FIG. 25 depicts an example layout with a keypad to the right having soft keys such as the delete, tab, home, end, arrow, and enter keys. As will be apparent, other suitable keys and layouts could also be used.

Figure 27:
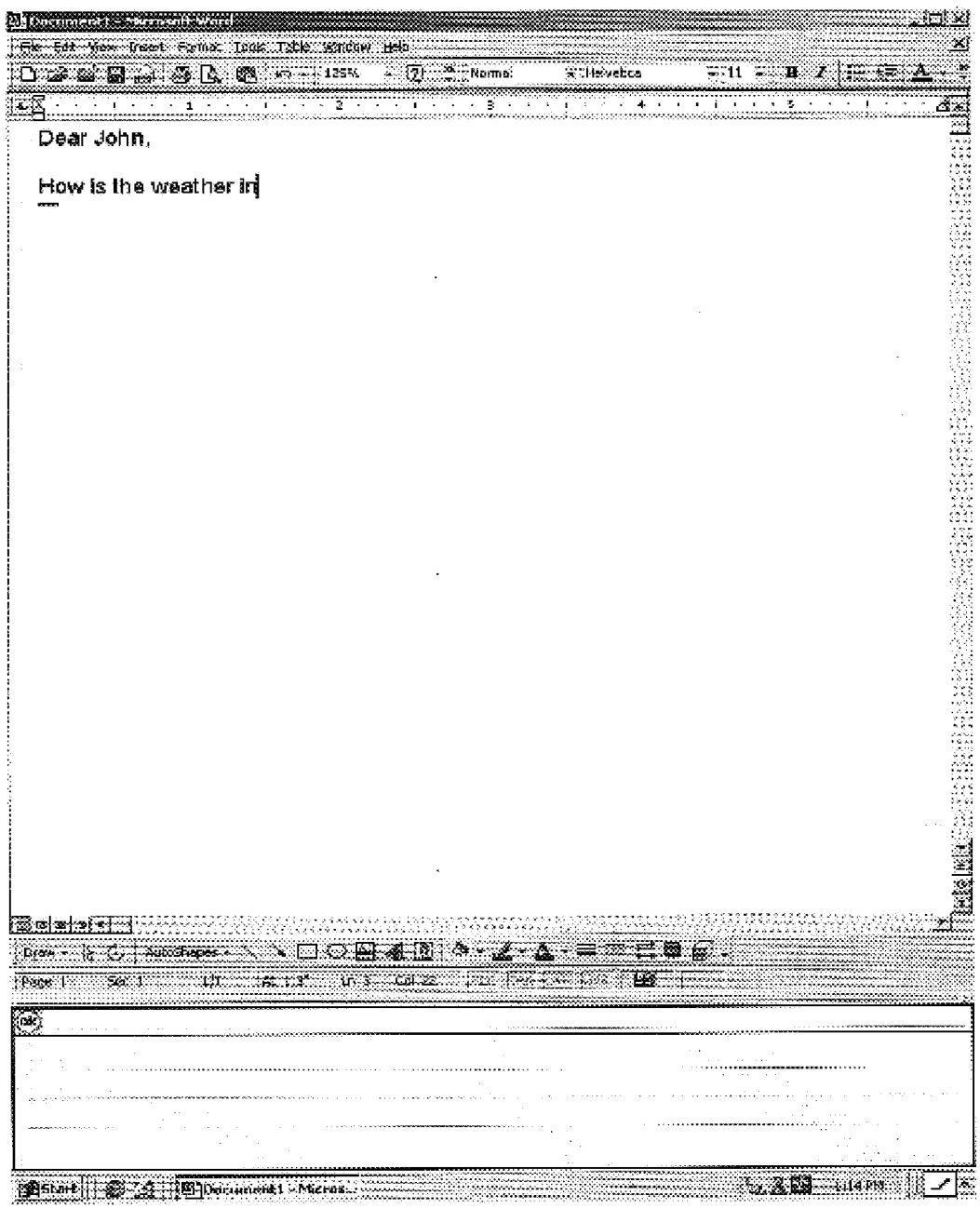
FIG. 27 depicts a TIP in conjunction with a word processor showing text in the word processing window that was input via the TIP.

As mentioned above, a user's goal in using a text input panel, in accordance with various inventive principles, would often be entering textual input into an application executing on the user's computer. FIG. 27 depicts a text input panel in conjunction with a word processor showing text that has been input to the word processing application via the text input panel.

What has been described above is merely illustrative of the application of the principles of the present invention. Those skilled in the art can implement other arrangements and methods without departing from the spirit and scope of the present invention. Any of the methods of the invention can be implemented in software that can be stored on computer disks or other computer-readable media. No claim should be interpreted to be in means-plus-function format.

We claim:

1. A system for accepting disparate types of computer user input, the system comprising:
   a user interface including a handwriting recognition area and a soft keyboard;
   a handwriting recognizer for recognizing handwritten text input by a user via the handwriting recognition area; and
   a text synchronizer for synchronizing text input by a user via the handwriting recognition area and via the soft keyboard by recognizing and preserving an order in which a user inputs text via the handwriting recognition area and the soft keyboard, wherein the handwriting recognition includes a character recognition area, the character recognition area including separate areas for recognizing lowercase letters, uppercase letters, numbers, and characters other than letters and numbers, respectively.

2. The system of claim 1 wherein:
   the user interface further includes a speech recognizer; and
   the text synchronizer recognizes and preserves an order in which the user inputs text via the speech recognizer, via the handwriting recognition area, and via the soft keyboard.

3. The system of claim 1 wherein the handwriting recognition area includes a word recognition area.

4. The system of claim 1 wherein the user interface includes a keybar or keypad having at least one key selected from the group consisting of: left arrow, right arrow, backspace, delete, space, end, home, enter, tab, and escape.

5. The system of claim 1 wherein the user interface includes a symbol pad having at least one key for entering symbols that are characters other than letters and numbers.

6. The system of claim 1 wherein the user interface includes a stage area for displaying a preview of recognized text input by the user.

7. A system for accepting disparate types of computer user input, the system comprising:
   a user interface including a handwriting recognition area and a soft keyboard;

a handwriting recognizer for recognizing handwritten text input by a user via the handwriting recognition area; and a text synchronizer for synchronizing text input by a user via the handwriting recognition area and via the soft keyboard by recognizing and preserving an order in which a user inputs text via the handwriting recognition area and the soft keyboard, the user interface includes a plurality of tabs for switching from displaying one of the soft keyboard and the handwriting recognition area, wherein the handwriting recognition includes a character recognition area, the character recognition area including separate areas for recognizing lowercase letters, uppercase letters, numbers, and characters other than letters and numbers, respectively.

8. A system for accepting disparate types of computer user input, the system comprising:

a user interface including a handwriting recognition area and a soft keyboard;

a handwriting recognizer for recognizing handwritten text input by a user via the handwriting recognition area; and a text synchronizer for synchronizing text input by a user via the handwriting recognition area and via the soft keyboard by recognizing and preserving an order in which a user inputs text via the handwriting recognition area and the soft keyboard, wherein the handwriting recognition area includes a gesture area for recognizing handwritten gestures and a character recognition area, the character recognition area including separate areas for recognizing lowercase letters, uppercase letters, numbers, and characters other than letters and numbers, respectively.

9. A method of accepting disparate types of computer user input, the method comprising:

recognizing handwritten user input to provide recognized handwritten user input;

recognizing soft keyboard presses to provide recognized soft keyboard presses;

integrating text input by a user by synchronizing the recognized handwritten user input and the recognized soft keyboard presses; and recognizing gestures inked by a user onto a character recognition area or a word recognition area wherein the character recognition area includes separate areas for recognizing lowercase letters, uppercase letters, numbers, and characters other than letters and numbers, respectively.

10. The method of claim 9 further comprising:

recognizing spoken user input to provide recognized spoken user input; and integrating text input by a user by synchronizing the recognized spoken user input, the recognized handwritten user input, and the recognized soft keyboard presses.

11. The method of claim 9 further comprising: displaying a preview of the recognized text input by a user.

12. The method of claim 9 further comprising: passing the recognized text to an operating system message router.

13. The method of claim 9 further comprising: passing the recognized text to an application program.

14. The method of claim 9 further comprising: recognizing words inked by a user onto the word recognition area.

15. The method of claim 14 further comprising: recognizing characters inked by a user onto the character recognition area.

16. A text input panel for accepting disparate types of computer user input, the text input panel comprising:

a keyboard tab that, when selected, activates a soft keyboard for accepting soft keyboard presses;

a word recognizer tab that, when selected, activates a word recognizer area for accepting user input in the form of handwritten words; and a character recognizer tab that, when selected, activates a character recognizer area for accepting user input in the form of handwritten characters wherein the character recognizer area includes separate areas for recognizing lowercase letters, uppercase letters numbers and characters other than letters and numbers, respectively.

17. The text input panel of claim 16 wherein the text input panel includes a tab for alternately hiding and displaying the text input panel.

18. The text input panel of claim 16 wherein the text input panel is displayed translucently such that a user can see through the text input panel.

* * * * *